US009509799B1

(12) United States Patent
Cronin

(10) Patent No.: US 9,509,799 B1
(45) Date of Patent: Nov. 29, 2016

(54) PROVIDING STATUS UPDATES VIA A PERSONAL ASSISTANT

(71) Applicant: GRANDIOS TECHNOLOGIES, LLC, Charleston, SC (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 0 days.

(21) Appl. No.: 14/311,538

(22) Filed: Jun. 23, 2014

Related U.S. Application Data

(60) Provisional application No. 62/007,930, filed on Jun. 4, 2014.

(51) Int. Cl.
*H04L 29/08* (2006.01)
*G06F 3/0484* (2013.01)

(52) U.S. Cl.
CPC .............. *H04L 67/32* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 5,812,977 A | 9/1998 | Douglas | |
| 5,873,660 A | 2/1999 | Walsh et al. | |
| 6,181,344 B1 | 1/2001 | Tarpenning et al. | |
| 6,212,408 B1 | 4/2001 | Son et al. | |
| 6,757,362 B1 * | 6/2004 | Cooper | H04M 3/527 379/88.01 |
| 6,996,227 B2 | 2/2006 | Albal et al. | |
| 7,912,910 B2 | 3/2011 | Banerjee et al. | |
| 8,386,929 B2 * | 2/2013 | Zaika | G06F 3/0482 707/805 |
| 8,543,834 B1 | 9/2013 | Barra | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |

(Continued)

OTHER PUBLICATIONS

Botla, Purshotham; "Designing Personal Assistant Software for Task Management using Semantic Web Technologies and Knowledge Databases", May 2013.

(Continued)

*Primary Examiner* — Phenuel Salomon
*Assistant Examiner* — Mahelet Shiberou
(74) *Attorney, Agent, or Firm* — Polsinelli LLP

(57) ABSTRACT

Methods and systems are presented for providing a status report with a personal assistant feature of a user device (e.g., mobile phone). In some embodiments, when a user inputs a status command at an interface of a user device, a personal assistant feature will display a status report. The status report may include information that is responsive to a plurality of different personal assistant commands, but a user need only input the single status command to obtain all the information. The status report may be customized based on user-editable status report settings. The status report may be based on local status data from a database on the user device and remote status data from third party.

20 Claims, 5 Drawing Sheets

(56) References Cited

U.S. PATENT DOCUMENTS

| | | | |
|---|---|---|---|
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 8,995,972 B1 | 3/2015 | Cronin | |
| 9,190,075 B1 | 11/2015 | Cronin | |
| 9,413,868 B2 | 8/2016 | Cronin | |
| 2002/0129053 A1 | 9/2002 | Chan et al. | |
| 2003/0139932 A1 | 7/2003 | Shao et al. | |
| 2003/0154069 A1 | 8/2003 | Carew et al. | |
| 2004/0062373 A1 | 4/2004 | Baker | |
| 2004/0257346 A1 | 12/2004 | Ong et al. | |
| 2005/0053201 A1 | 3/2005 | Bhargava et al. | |
| 2006/0067352 A1 | 3/2006 | John et al. | |
| 2007/0011610 A1* | 1/2007 | Sethi et al. | 715/700 |
| 2007/0016777 A1 | 1/2007 | Henderson et al. | |
| 2007/0035513 A1* | 2/2007 | Sherrard et al. | 345/157 |
| 2008/0165937 A1 | 7/2008 | Moore | |
| 2009/0111529 A1 | 4/2009 | Miyake | |
| 2009/0227232 A1 | 9/2009 | Matas et al. | |
| 2010/0103242 A1 | 4/2010 | Linaker | |
| 2010/0332583 A1 | 12/2010 | Szabo | |
| 2011/0037777 A1* | 2/2011 | Lindahl et al. | 345/619 |
| 2011/0119242 A1 | 5/2011 | Chen et al. | |
| 2011/0153324 A1 | 6/2011 | Ballinger et al. | |
| 2011/0234488 A1 | 9/2011 | Ge et al. | |
| 2011/0276583 A1 | 11/2011 | Stone et al. | |
| 2012/0016678 A1 | 1/2012 | Gruber et al. | |
| 2012/0035923 A1* | 2/2012 | Krause | 704/235 |
| 2012/0041903 A1 | 2/2012 | Beilby et al. | |
| 2012/0066393 A1 | 3/2012 | Tekwani | |
| 2012/0121077 A1 | 5/2012 | Gabay et al. | |
| 2012/0192096 A1 | 7/2012 | Bowman et al. | |
| 2012/0245944 A1 | 9/2012 | Gruber et al. | |
| 2012/0265528 A1 | 10/2012 | Gruber et al. | |
| 2012/0311583 A1* | 12/2012 | Gruber et al. | 718/100 |
| 2012/0311584 A1* | 12/2012 | Gruber et al. | 718/100 |
| 2013/0024196 A1 | 1/2013 | Ganong, III et al. | |
| 2013/0036211 A1 | 2/2013 | Messer et al. | |
| 2013/0054697 A1 | 2/2013 | Cha | |
| 2013/0073286 A1 | 3/2013 | Bastea-Forte et al. | |
| 2013/0086056 A1 | 4/2013 | Dyor et al. | |
| 2013/0110505 A1 | 5/2013 | Gruber et al. | |
| 2013/0159377 A1 | 6/2013 | Nash | |
| 2013/0185336 A1 | 7/2013 | Singh et al. | |
| 2013/0185368 A1 | 7/2013 | Nordstrom et al. | |
| 2013/0225137 A1 | 8/2013 | Greisson | |
| 2013/0225140 A1 | 8/2013 | Greisson | |
| 2013/0244579 A1 | 9/2013 | Hohteri et al. | |
| 2013/0258040 A1 | 10/2013 | Kaytaz et al. | |
| 2013/0278492 A1 | 10/2013 | Stolarz et al. | |
| 2013/0303192 A1 | 11/2013 | Louboutin | |
| 2013/0304758 A1 | 11/2013 | Gruber et al. | |
| 2013/0311598 A1 | 11/2013 | Arrouye et al. | |
| 2013/0311997 A1 | 11/2013 | Gruber et al. | |
| 2013/0317835 A1 | 11/2013 | Mathew | |
| 2013/0318473 A1* | 11/2013 | van Os et al. | 715/810 |
| 2013/0328917 A1 | 12/2013 | Zambetti | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0339334 A1 | 12/2013 | Brown et al. | |
| 2014/0059644 A1 | 2/2014 | Shin et al. | |
| 2014/0062773 A1 | 3/2014 | Macgougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0164400 A1* | 6/2014 | Kruglick | G06F 17/30887 707/749 |
| 2014/0167794 A1 | 6/2014 | Nath | |
| 2014/0168170 A1 | 6/2014 | Lazarescu | |
| 2014/0171114 A1 | 6/2014 | Marti | |
| 2014/0173439 A1 | 6/2014 | Gutierrez et al. | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0213280 A1 | 7/2014 | Sandel et al. | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0278436 A1* | 9/2014 | Khanna et al. | 704/275 |
| 2014/0283135 A1 | 9/2014 | Shepherd | |
| 2014/0293959 A1 | 10/2014 | Singh | |
| 2014/0362024 A1 | 12/2014 | Hicks | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026623 A1 | 1/2015 | Horne | |
| 2015/0031397 A1 | 1/2015 | Jouaux | |
| 2015/0088514 A1 | 3/2015 | Typrin | |
| 2015/0172463 A1* | 6/2015 | Quast | G06Q 50/30 379/88.01 |
| 2016/0072940 A1 | 3/2016 | Cronin | |

OTHER PUBLICATIONS

Campbell, Mikey, "Apple's 'smart dock' would give Siri a permanent place in the home," Dec. 5, 2013, pp. 1-13, http://appleinsider.com/articles/13/12/05/apples-smart-dock-would-bring-siri-into-the-home.

Chalupsky, Hans; "Electronic Elves: Agent Technology for Supporting Human Organization", Information Sciences Institute and Computer Science Dept., University of Southern California. 2002.

Collaborative and Conversational Agents, "Human-Computer Interactions." 2013.

Gervasio, Melinda T., "Active Preference Learning for Personalized Calendar Scheduling Assistance", AL Center, SRI International. IUI'05, Jan. 9-12, 2005.

"Gotopal—Your virtual personal assistance", by Indiegogo; Date of download: Jul. 10, 2014.

Hartung, Daniel and Busch, Christoph; "Biometric Transaction Authentication Protocol: Formal Model Verification and "Four-Eyes" Principle Extension", Norwegian Information Security Laboratory Faculty for Computer Science and Media Technology, Gjovik University College. 2011.

"How to Use Siri to Make Phone Calls", for Dummies—Making Everything Easier. www.dummies.com: Date of download: Jul. 16, 2014.

Joyce, Stephen; Tlabs Showcase—Siri—Tnooz; Date of download: Nov. 26, 2013.

Kazmucha, Allyson; "How to call, message, and email your contacts using Siri", iMore. Jun. 18, 2014.

Lardinois, Frederic; "Google Now: There's a Fine Line Between Cool and Creepy", TechCrunch, Jul. 22, 2012.

Leber, Jessica; "Smart Assistant Listens to You Talk, Fetches Info Automatically", MIT Technology Review. Jan. 17, 2013.

"Microsoft unveils new Siri-like phone assistant", the Logan Reporter, Apr. 3, 2014.

"Mobile Voice Conference 2014" San Francisco, CA Mar. 3-5, 2014.

Petersen, Sobah Abbas; "Distributed Artificial Intelligence and Intelligent Agents." Jan, 30, 2003 http://www.idi.ntnu.no/~agent/.

Sateli, Bahar; "Smarter Mobile Apps through Integrated Natural Language Processing Services", Semantic Software Lab, Dept. of Computer Science and Software Engineering, Concordia University. Aug. 2013.

(56) References Cited

OTHER PUBLICATIONS

Speaktoit—Your Personal Assistant; Date of download: Jul. 14, 2014.
Tambe, Milind; "Electric Elves: What Went Wrong and Why" 2005.
"The Design a Proactive Personal Agent for Task Management", Jan. 11, 2011. International Journal on Artificial Intelligence Tools, vol. 21, No. 1 (2012) 1250004 (30 pages) © World Scientific Publishing Company.
"The Siri Handbook", by BookCap Study Guides © 2011 by Golgatha Press, Inc., Published at SmashWords.
U.S. Appl. No. 14/261,421; Final Office Action mailed Nov. 19, 2014.
U.S. Appl. No. 14/261,721; Office Action mailed Oct. 8, 2014.
U.S. Appl. No. 14/261,421; Office Action mailed Aug. 28, 2014.
U.S. Appl. No. 14/309,217; Office Action mailed Sep. 17, 2014.
U.S. Appl. No. 14/261,421; Office Action mailed Sep. 24, 2015.
U.S. Appl. No. 14/261,721; Final Office Action mailed Feb. 18, 2015.
U.S. Appl. No. 14/261,421, John Cronin, Selectively Querying Third Party Response Databases by Personal Assistant Devive, filed Apr. 25, 2014.
U.S. Appl. No. 14/261,721, John Cronin, Providing Virtual Assistance on Telephone Calls, filed Apr. 25, 2014.
U.S. Appl. No. 14/265,565, John Cronin, Providing Reading Assistance by a Personal Assistant, filed Feb. 18, 2015.
U.S. Appl. No. 14/261,721; Office Action mailed Jun. 22, 2015.
U.S. Appl. No. 14/625,565; Office Action mailed Jun. 29, 2015.
U.S. Appl. No. 14/674,537; Office Action mailed Jun. 11, 2015.
U.S. Appl. No. 14/942,949, John Cronin, Automatic Personal Assistance Between Users Devices, filed Nov. 16, 2015.
U.S. Appl. No. 14/261,421 Final Office Action mailed Feb. 5, 2015.
U.S. Appl. No. 14/261,721 Final Office Action mailed Jan. 4, 2016.
U.S. Appl. No. 14/625,565 Final Office Action mailed Jan. 4, 2016.
U.S. Appl. No. 14/942,949 Office Action mailed Mar. 16, 2016.
U.S. Appl. No. 14/625,565 Office Action mailed Sep. 1, 2016.

\* cited by examiner

PROVIDING STATUS UPDATES VIA A PERSONAL ASSISTANT

CROSS-REFERENCE TO RELATED APPLICATIONS

The present invention claims priority benefit to U.S. provisional patent application No. 62/007,930, filed Jun. 4, 2014, the entirety of which is incorporated by reference.

BACKGROUND OF THE INVENTION

1. Field of the Invention

The present invention generally concerns a personal assistant feature on a user device. More particularly, the present invention concerns obtaining customizable status updates from the personal assistant.

2. Description of the Related Art

A digital intelligent personal assistant software application (e.g., personal assistant) is commonly run on a smart phone or intelligent device. Personal assistant applications may respond to user input, including, for example, voice-based input, often taking the form of a query or command. Based on the received user input, a personal assistant application may perform tasks by utilizing location awareness and accessing information stored on the smart device and web services. In doing so, the application appears to answer questions, make recommendations, and perform other actions. A personal assistant may perform pointed actions in response to user commands, including, for example, sending a message to a particular person or scheduling a specific meeting at a specific time in a calendar. Existing personal assistant applications respond to an increasing number of commands, which makes it challenging for a user to keep up with all of the available commands and thus to take advantage of all of the personal assistant's functions.

Existing personal assistant applications do not, however, provide customizable status updates that obviate the need to input multiple individual questions or commands. There exists a need to provide compound status updates via a personal assistant running on a user device, the status updates customizable to an individual user's needs.

SUMMARY OF THE CLAIMED INVENTION

Methods and systems are presented for providing a status report with a personal assistant feature of a user device (e.g., mobile phone). In some embodiments, when a user inputs a status command at an interface of a user device, a personal assistant feature will display a status report. The status report may include information that is responsive to a plurality of different personal assistant commands, but a user need only input the single status command to obtain all the information. The status report may be customized based on user-editable status report settings. The status report may be based on local status data from a database on the user device and remote status data from third party.

Various embodiments may include methods for providing a status report with a personal assistant of a user device. Such methods may include receiving user input via a user interface, wherein the received user input includes a personal assistant status command, and wherein the personal assistant status command incorporates a plurality of personal assistant commands. The method may also include executing instructions stored in memory, wherein the execution of the instructions by the processor retrieves local status data, the local status data stored in memory of the user device and associated with the user device, and retrieves remote status data, the remote status data retrieved from a remote server. The execution of instructions stored in memory by the processor further generates a status report based on the retrieved local status data and remote status data, the status report including information responsive to the plurality of personal assistant commands, and displays the status report on the user interface.

Various embodiments may further include systems for providing a status report with a personal assistant of a user device. Such systems may include a user interface that receives user input, wherein the received user input includes a personal assistant status command, and wherein the personal assistant status command incorporates a plurality of personal assistant commands. The system may further include a memory that stores instructions, and a processor that executes the instructions stored in the memory. The processor executes the instructions to retrieve local status data, the local status data stored in the memory of the user device and associated with the user device, and to retrieve remote status data, the remote status data retrieved from a remote server. The processor further executes the instructions to generate a status report based on the retrieved local status data and remote status data, the status report including information responsive to the plurality of personal assistant commands, and display the status report on the user interface.

Embodiments of the present invention may further include non-transitory computer-readable storage media, having embodied thereon a program executable by a processor to perform methods for displaying next application suggestions on a user device as described herein.

DETAILED DESCRIPTION

Methods and systems are presented for providing a status report with a personal assistant feature of a user device (e.g., mobile phone). In some embodiments, when a user inputs a status command at an interface of a user device, a personal assistant feature will return a customizable status report. Personal assistant software may be an application loaded onto the user device by the user, or any combination of software, firmware, and hardware that is incorporated into the user device. A personal assistant software application on a user device may provide a status report based on local status data stored locally on the user device and/or remote status data accessed through a network.

Figure 1:
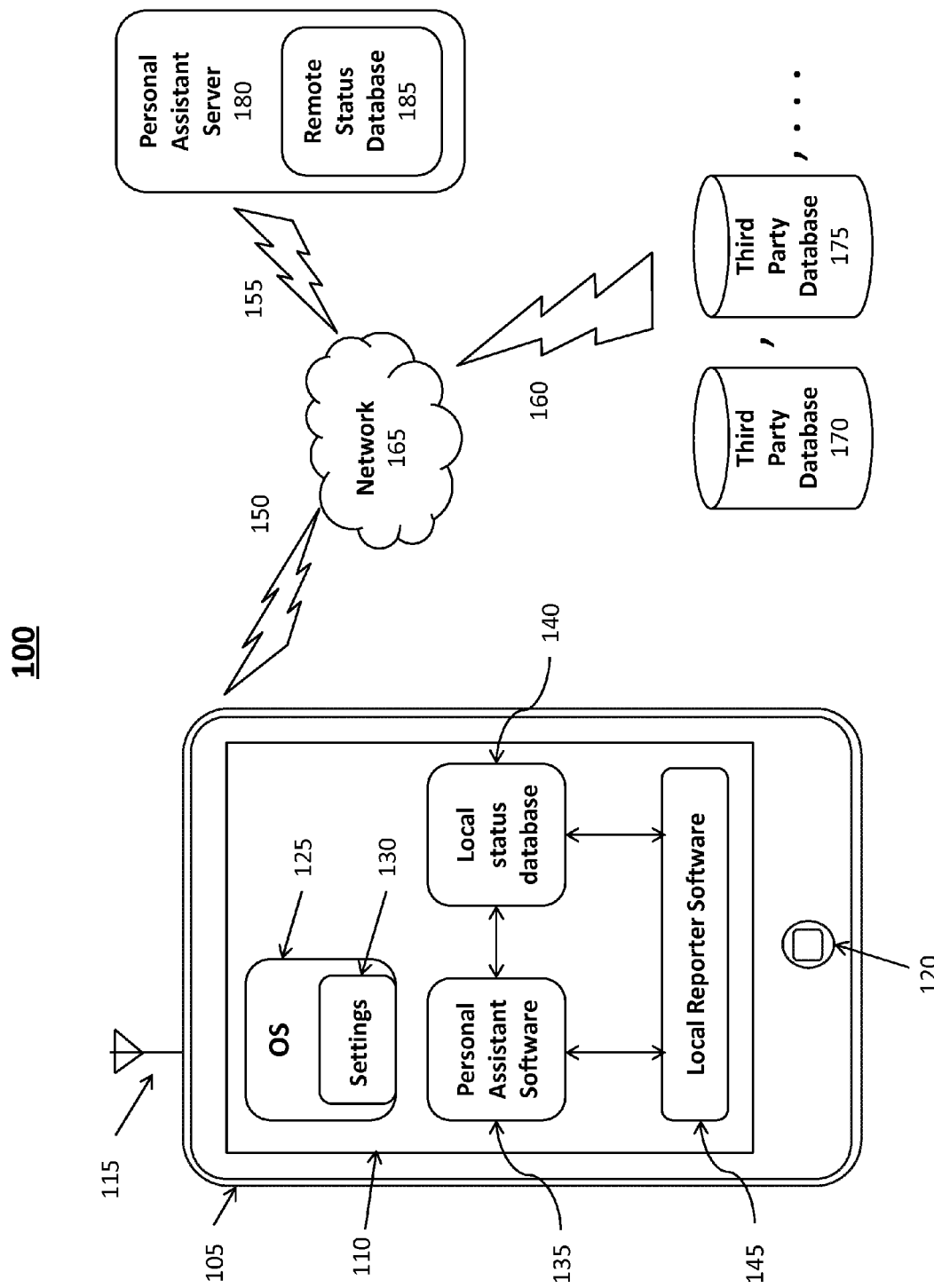
FIG. 1 illustrates an exemplary network environment in which a system for providing status reports on a user device may be implemented.

FIG. 1 illustrates an exemplary network environment 100 in which a system for displaying next application suggestions on a user device may be implemented. Network environment 100 may include user device 105, network 165, network connections 150, 155, and 160, share application search server 175 ("share app search server"), and third party server 180. Any combination of the components illustrated in network environment 100, including user device 105, network 165, network connections 150, 155, and 160, share app search server 175, third party server 180, and modules, processes, or subsystems of each, and any other hardware, software, or both, for implementing the features described in the present disclosure may be collectively referred to, herein, as "the system."

User device 105 may be any number of different electronic user devices 105, such as general purpose computers, mobile phones, smartphones, personal digital assistants (PDAs), portable computing devices (e.g., laptop, netbook, tablet), desktop computing devices, handheld computing device, or any other type of computing device capable of communicating over network 165. User devices 105 may also be configured to access data from other storage media, such as memory cards or disk drives as may be appropriate in the case of downloaded services. User device 105 may include standard hardware computing components, including, for example, network and media interfaces, non-transitory computer-readable storage (memory), and processors for executing instructions that may be stored in memory.

In the illustrated embodiment, user device 105 (e.g., mobile phone) includes display 110. In some implementations, display 110 may be a touchscreen display. In some implementations, display 110 is a user interface. Display 110 may display icons corresponding to applications (e.g., APP1, APP2, and APP3 shown in the illustrated embodiment). Display 110 may include any suitable soft keys. It will be understood that user device 105 may include other elements not shown, for example, a microphone, camera, speaker, or any other suitable hardware or software elements.

User device 105 may include an operating system 125. Operating system 125 may be software that manages the use of hardware, computer programs, and applications of user device 105. Operating system 125 may be, for example, Windows, iOS, OS X, Android, UNIX, or Linux. User device 105 may additionally include settings 130, which may include configurable components of operating system 125. Settings 130 may be modifiable by a user of the user device to alter the performance of operating system 125 and other software on user device 105. In some embodiments, settings 130 may be an application on the user device 105, by which a user may select options and preferences and configures operating system functions. In an example, operating system 125 of user device 105 (e.g., an Apple device) may be iOS, and the settings 130 of user device 105 may be iOS settings. In another example, operating system 125 may be LINUX, and the settings 130 may be LINUX configuration files. In some embodiments, settings 130 may include personal assistant settings, which are modifiable by a user to alter the performance of personal assistant software 135. In some embodiments, settings 130 may be modifiable by a user to configure access to and/or sharing of data with share app search server 175 and third party server 180.

User device 105 may include any suitable software or applications. In some embodiments, personal assistant software 135 runs on user device 105. The personal assistant may be software capable of performing tasks for a user based on, for example, user input, location awareness (e.g., using a global positioning system), user settings 130, locally stored information (i.e., local status database 140) and information accessible over a network (e.g., network 165) from personal assistant server 180 and third party databases 170 and 175. Existing, exemplary, personal assistants include, for example, SIRI® services (for Apple devices), GOOGLE NOW® services (for Google Android devices), S VOICE® (for Samsung devices), and VOICE MATE® services, (for LG Electronics devices). It will be understood that the examples of existing intelligent personal assistants described herein are merely exemplary, and the system of the present disclosure may be implemented using any suitable hardware and/or software.

In some embodiments, personal assistant software 135 is a personal assistant application running on user device 105. Personal assistant software 135 may, for example, send messages, make telephone calls, set reminders, make calendar appointments, retrieve data locally or remotely, perform internet searches, or perform any other suitable actions in response to user input. In some embodiments, depressing electromechanical button 120 may activate the personal assistant. In some embodiments, actuating a personal assistant soft key may turn the personal assistant ON or OFF. Personal assistant software may receive a status command from a user (e.g., voice input) and deliver a status report using local and/or remote status data received from local reporter software 145.

Local status database 140 may be any suitable database capable of storing data on user device 105. Local status database 140 may store local status data, which may include, for example, information related to user device 105, including, the software, firmware, applications, and hardware of user device 105. In some embodiments, local application search database 140 may be implemented as part of personal assistant software 135. In some embodiments, local status database 140 may be implemented on a device separate from user device 105 and be accessible by network 165.

Local reporter software 145 may be any suitable software or application suitable for interacting with local status database 140 and personal assistant software 135 for providing a customizable status report. In some embodiments, local reporter software may be implemented as part of personal assistant software 135. In some embodiments, local reporter software 145 updates local status database 140. In some embodiments, local reporter software 145 may retrieve data from personal assistant server 180, including remote status database 185, and third party databases 170 and 175 over network 165 via network communications 150, 155, and 165.

As illustrated in FIG. 1, personal assistant software 135, local status database 140, and local reporter software 145 may be internally connected such that data may be sent and received in order to provide status reports via personal assistant software 135. It will be understood that the illustrated embodiment is merely exemplary, and that any other suitable software, firmware, or hardware may be implemented.

Applications (not shown) are software modules on user device 105, which may be downloaded from remote servers. Applications may provide additional functions for user device 105. For example, applications may be any suitable applications downloaded from, for example, Apple Inc.'s APP STORE® (for Apple devices), GOOGLE PLAY® (for Google Android devices), or any other suitable database or server. In some embodiments, applications may be software, firmware, or hardware that is integrated into the user device 105.

Antenna 125 is a component of user device 105. In some embodiments, user device 105 may use antenna 125 to send and receive information wirelessly. For example, antenna 125 may be a cellular data antenna, Wi-Fi antenna, or BLUETOOTH® antenna.

Network connections 150, 155, and 160 may include any suitable wired or wireless transmission mediums or channels through which data may be communicated between user device 105, network 165, third party databases 170 and 175, and personal assistant server 180. Network connections may include, for example, a computer networking cable, an Ethernet cable, a cellular communications network, an Internet data trunk (e.g., single transmission channel), a wireless local area network, a wide area network, or a telecommunications network (e.g., 4G wireless network).

Network 165 may include the Internet, a system of interconnected computer networks that use a standard protocol, a dispersed network of computers and servers, a local network, a public or private intranet, any other coupled computing systems, or any combination thereof. In some embodiments, network 165 may be a cloud, which is a network of remote servers hosted on the Internet and used to store, manage, and process data in place of local servers or personal computers. User device 105 may be coupled to network 165 though any suitable wired or wireless connection. In some embodiments, user device 105 may be coupled to network 165 via network connection 150.

Network 165 may allow for communication between the user device 105, third party databases 170 and 175, and personal assistant server 180 via various communication paths or channels. Such paths or channels may include any type of data communication link known in the art, including TCP/IP connections and Internet connections via Wi-Fi, BLUETOOTH, a Universal Mobile Telecommunications System (UMTS) network, or any other suitable data communication link. In that regard, network 165 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 165 allows for communication between any of the various components of network environment 100.

Personal assistant server 180 is a server that manages functions of the personal assistant running on user device 105 and is coupled to network 165 via network connection 155. Personal assistant server 180 may be any suitable remote or local server that stores data. In some embodiments, personal assistant server 180 is an electronic storage device. Personal assistant server 180 is accessible by other devices through network 165. In the shown embodiment, personal assistant server 180 includes remote status database 185.

Personal assistant server 180 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

Remote status database 185 may be any suitable structure that stores data. As shown, remote status database 185 may be implemented as part of personal assistant server 180. In some embodiments, remote status database 185 may be implemented on a server or other device separate from personal assistant server 180 and be accessible by network 165. In some embodiments, remote status database 185 stores remote status data retrieved from third party databases 170 and 175. Remote status data may include, for example, news, stocks, or other categories of information available retrieved from any accessible third party source. Remote status database 185 may be accessible by local reporter software 145 of user device 105 over network 165. For example, local reporter software 145 may retrieve remote status data, according to user settings 130, to upload to local status database 140, which may then be used by personal assistant 135 for providing a status report on an interface of user device 105.

In some embodiments, third party databases 170 and 175 may store remote status data, retrievable by user device 105 over network 165. In some embodiments, third party databases 170 and 175 may be coupled to network 165 by network communications 160. Third party databases 170 and 175 are accessible by other devices through network 165. In some embodiments, personal assistant server 180 and user device 105 may be connected to third party databases 170 and 175 over network 165 and network communications 150, 155, and 160. It will be understood that FIG. 1 depicts two exemplary third party databases 170 and 175 for purposes of brevity and clarity and that any suitable number third party databases may be coupled to network 165 via network connection 160.

Figure 2:
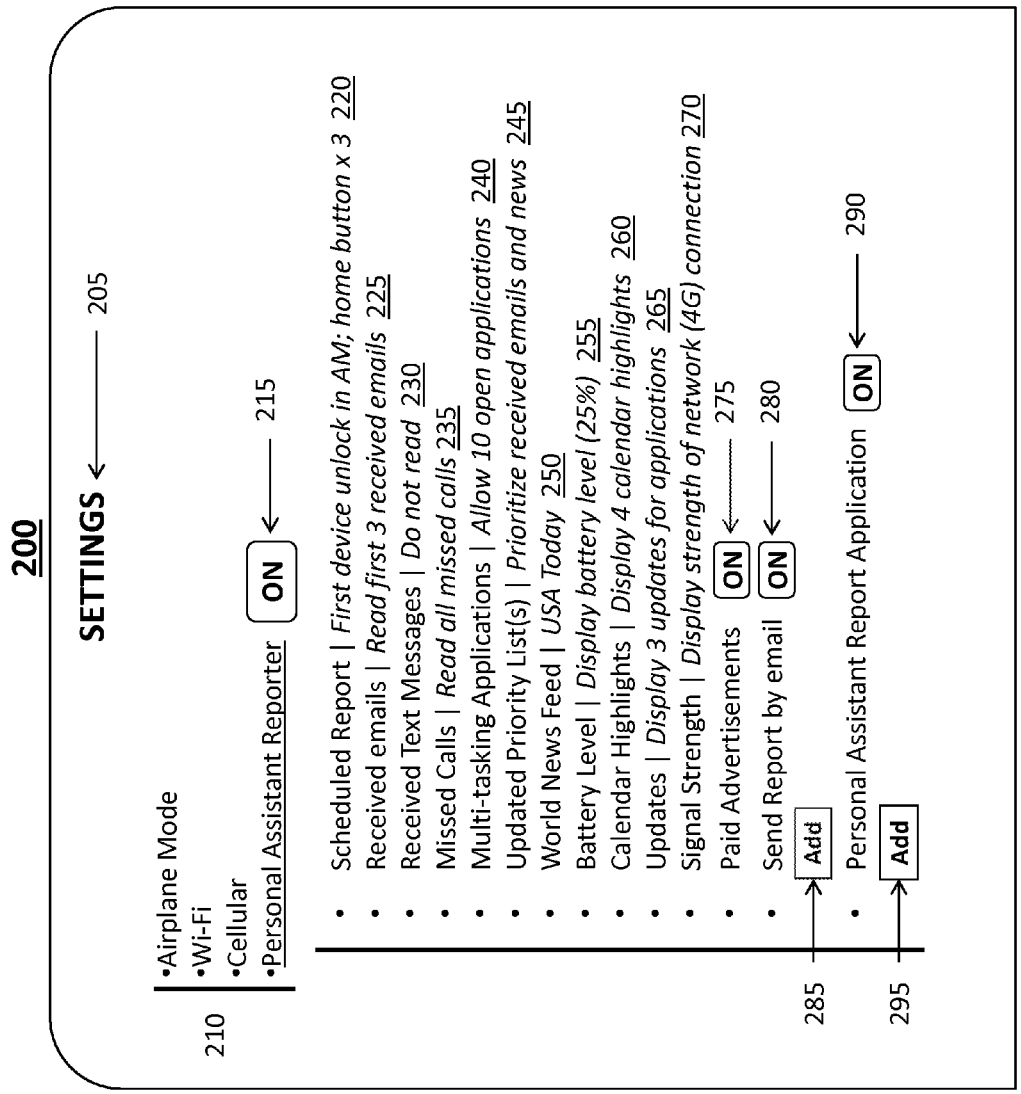
FIG. 2 is a diagram illustrating exemplary settings of an operating system on a user device that may be used with a system for providing status reports.

FIG. 2 is a diagram illustrating exemplary settings 200 of an operating system on a user device that may be used with a system for providing next application suggestions. In some embodiments, settings 200 may be displayed on a display screen of user device 105 of FIG. 1. Settings 200 may, for example, provide a mechanism by which a user may alter the functions of an operating system of a user device by implementing changes to settings. User interface 200 may facilitate user interaction with a user device.

User interface 200 may include settings menu 205. Settings menu 205 may include user-editable features for customizing the functionality of an operating system or user device according to user preferences. In some implementations, settings of operating system 125 of user device 105 of FIG. 1 may be modified by the user interacting with options or commands in a respective settings menu 205. Settings menu 205 may include any number of user-selectable options or commands. Settings menu 205 may include any suitable number of standard operating system or user device settings, for example, standard settings 210, including airplane mode, Wi-Fi, and cellular, as shown in FIG. 2. Standard settings 210 are exemplary interface elements that, when selected by a user, may, for example, redirect the user to a respective new page, window, or dialogue box.

In some embodiments, settings menu 205 includes a list of user-selectable options or settings presented in a hierarchical order. For example, personal assistant reporter application settings 215 may be sub-settings under standard settings 210. Standard settings 210 may include personal assistant reporter application settings 215, which is shown as selected (e.g., underlined) in FIG. 2, and the selection of personal assistant reporter application settings 215 may reveal status report settings 220-295. Personal assistant reporter application settings 215 include exemplary settings categories that, when selected by a user, may, for example, redirect the user to a respective new page, window, or dialogue box. In another example, when selected, any of the interface elements may expand to reveal sub-options, sub-commands, or any other suitable settings display elements.

In some embodiments, the personal assistant reporter application settings 215 may include user-editable features for customizing the functionality of a personal assistant reporter application running on a user device. In some embodiments, personal assistant reporter application settings 215 may be used to customize the functionality of local reporter software 145 of FIG. 1. As illustrated in FIG. 2, personal assistant reporter application settings 215 may include a mechanism for selection and de-selection of status report settings. In the shown embodiment, on/off selection buttons are illustrative examples of mechanisms for selection and de-selection of status report settings. In some embodiments, selection and de-selection in settings menu 205 are binary selections.

In some embodiments, personal assistant reporter application settings 215 includes a sub-menu of status report settings 220-295, which are user-selectable options or commands for determining the functionality of auto suggest software running on the user device. The personal assistant reporter application settings 215 may include any suitable number of selectable status report settings 220-295, which may correspond to exemplary data to be included or excluded from a status report, as shown in FIG. 2. In the illustrated embodiment, personal assistant reporter application settings 215 is selected to be "ON," indicating the feature is activated.

In the illustrated embodiment, exemplary status report settings 220-295 are shown. Scheduled Report 220 allows a user to schedule a status report, for example, at the first device unlock in morning or when the home button (e.g., electromechanical button 120) is depressed three times in rapid succession. Multi-tasking applications 240 allow a user to set how many applications may be open, for example 10. Updated priority list 245 allows a user to prioritize certain status data, for example, email (e.g., stored locally) and news (e.g., retrieved from remote database). Priority lists may determine, for example, which data should appear on a notifications pane/menu on a user device, or the data which should appear first in a status report. Paid advertisements 275, which are shown as "ON," allow a user to choose whether advertisements may appear in a status report. Send report by email 280, which is shown as "ON," allows a user to choose how a status report will be delivered. Add 285 may be used to add different mediums for delivery a status report. For example, a status report may be delivered via text message and as audio output through a speaker of a user device via a personal assistant application (e.g., personal assistant software 135 of FIG. 1). Personal Assistant Report Application 290, which is shown as "ON," allows the user to control whether a personal assistant report application will be used to provide status reports and/or will be made available to the user for customizing status reports. Add 295 may be used to add different/additional user device applications, software, firmware, or hardware for providing and customizing status reports.

Status report settings may be used to dictate what and how much local status data is reported in a status report. For example, received emails 225, received text messages 230, and missed calls 235 are exemplary communication settings that tell the personal assistant whether and how to include missed communications in a status report (e.g., read first 3 received emails; do not read received text messages; and read all missed calls). Battery level 255 allows the user to include the battery level (e.g., 25%) in a status report. Calendar highlights 260 allows a user to choose whether and how many calendar events (e.g., 4 calendar highlights) to be displayed and for what period (e.g., for the day of the report or the next week). Updates 270 allows a user to choose whether and how many updates, due or performed, to display (e.g., 3 application updates). Signal strength 270 allows a user to include the signal strength of a network connection or Wi-Fi connection (e.g., strength of 4G network connection) in a status report.

Status report settings may be used to dictate what and how much remote status data is reported in a status report. For example, status report settings may allow a user to choose from which third party databases/sources remote status data is retrieved. For example, world news feed 250 allows a user to set a preferred domain/database from which to retrieve world news (e.g., USA Today). Other status report settings may allow a user to set third party databases for stock feeds, local news feeds, weather, or any other suitable set of data retrievable from a third party server/database over a network. Status report settings may also be used to select what types of status data is to be retrieved and reported. For example, a user may add (not shown) an intellectual property news feed and a celebrity gossip news feed to his or her status report via status report settings.

Figure 3:
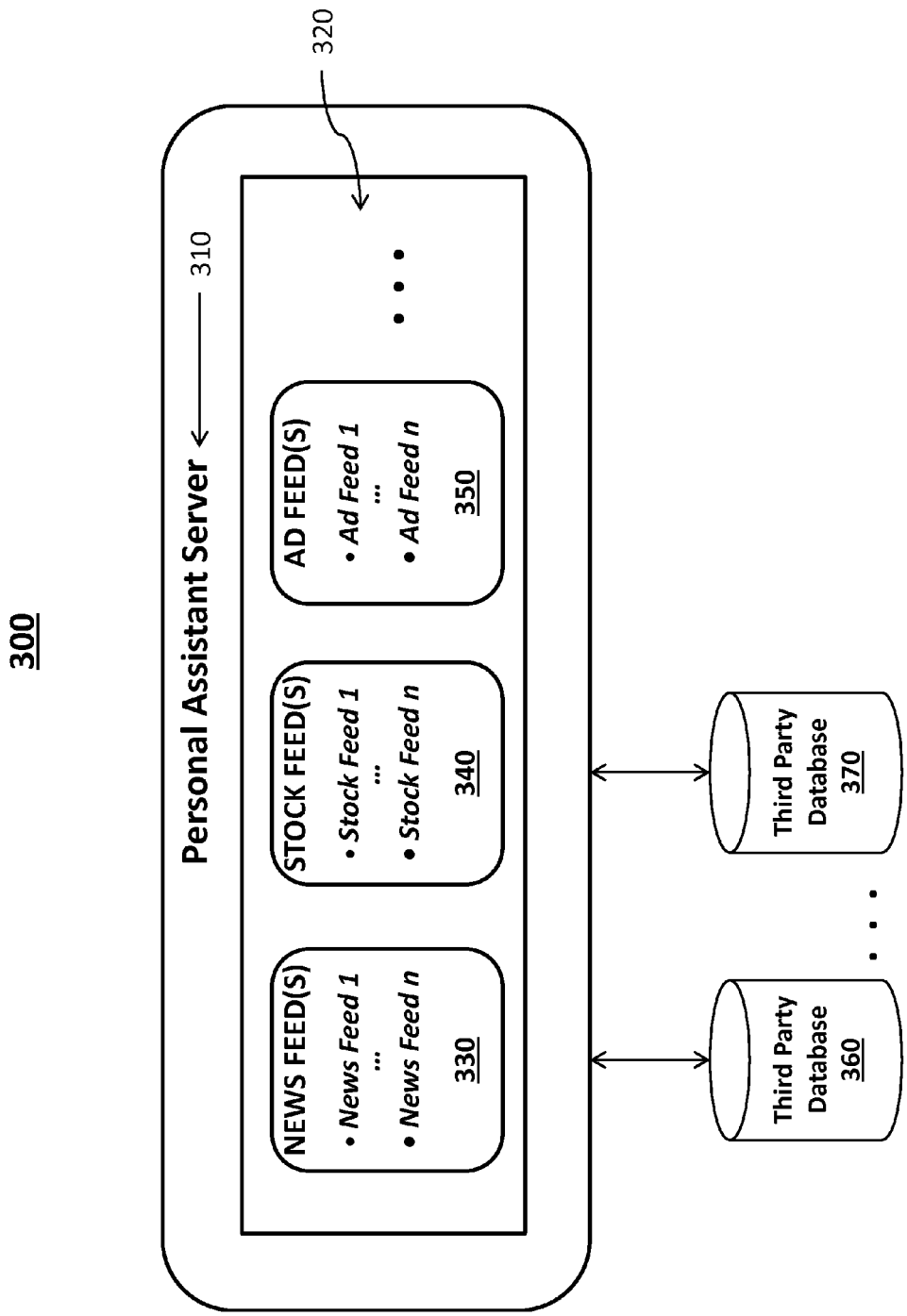
FIG. 3 is a detailed diagram of an exemplary remote server that may be used in a system for retrieving remote status data.

FIG. 3 is a detailed diagram of an exemplary remote server that may be used in a system for retrieving remote status data. Remote server 300 may be a personal assistant server 310. In some embodiments, personal assistant server 310 may correspond to personal assistant server 180 of FIG. 1. Personal assistant server 180 may include remote status database 320, which may, in some embodiments, correspond to remote status database 185 of FIG. 1. As shown, personal assistant server 310 may be connected to third party databases 360 and 370 over a network, and personal assistant server 310 may retrieve data from third party databases 360 and 370 for storage in remote status database 320. In some embodiments, third party databases 360 and 370 correspond to third party databases 170 and 175 of FIG. 1. It will be understood that any suitable number of third party databases may be used.

In some embodiments, remote status database 320 may maintain any suitable number of data feeds based on data retrieved from third party databases 360 and 370. Examples of data feeds include news feeds 330 (including news feed 1 . . . news feed n) and stock feeds 340 (including stock feed 1 . . . stock feed n), ad feeds 350 (including ad feed 1 . . . ad feed n), and any other suitable data feeds. Stock feeds may be feeds that are pre-stocked in personal assistant server 310, including, for example pre-stocked scheduled report 220 of FIG. 2. Thus, remote status database 320 may store any suitable number of data feeds including information retrieved from any suitable number of third party feeds/databases/sources. In some embodiments, personal assistant server 310 extracts remote status data from third party databases 360 and 370 daily. In some embodiments, personal assistant server 310 extracts remote status data from third party databases 360 and 370 in real-time. In some embodiments, personal assistant server 310 extracts remote status data in accordance with user settings, as described above in connection with FIG. 2. For example, a daily extraction may be performed at 7 am according to user settings. In another example, a user may add data feeds in user settings, and personal assistant server 310 may extract data accordingly.

The extracted remote status data may be stored in remote status database 320. In some embodiments, remote status database 320 stores only data feeds selected by the user, for example, in user settings, as described above in connection with FIG. 2. In some embodiments, local reporter software running on a user device (e.g., local reporter software 145 of user device 105 of FIG. 1) may retrieve remote status data from remote status database 320. In some embodiments, local reporter software may update a local status database (e.g., local status database 140 of FIG. 1) with the retrieved remote status data. Personal assistant software (e.g., personal assistant software 135) may generate and display a status report based on the remote status data and local status data stored in the local status database.

Figure 4:
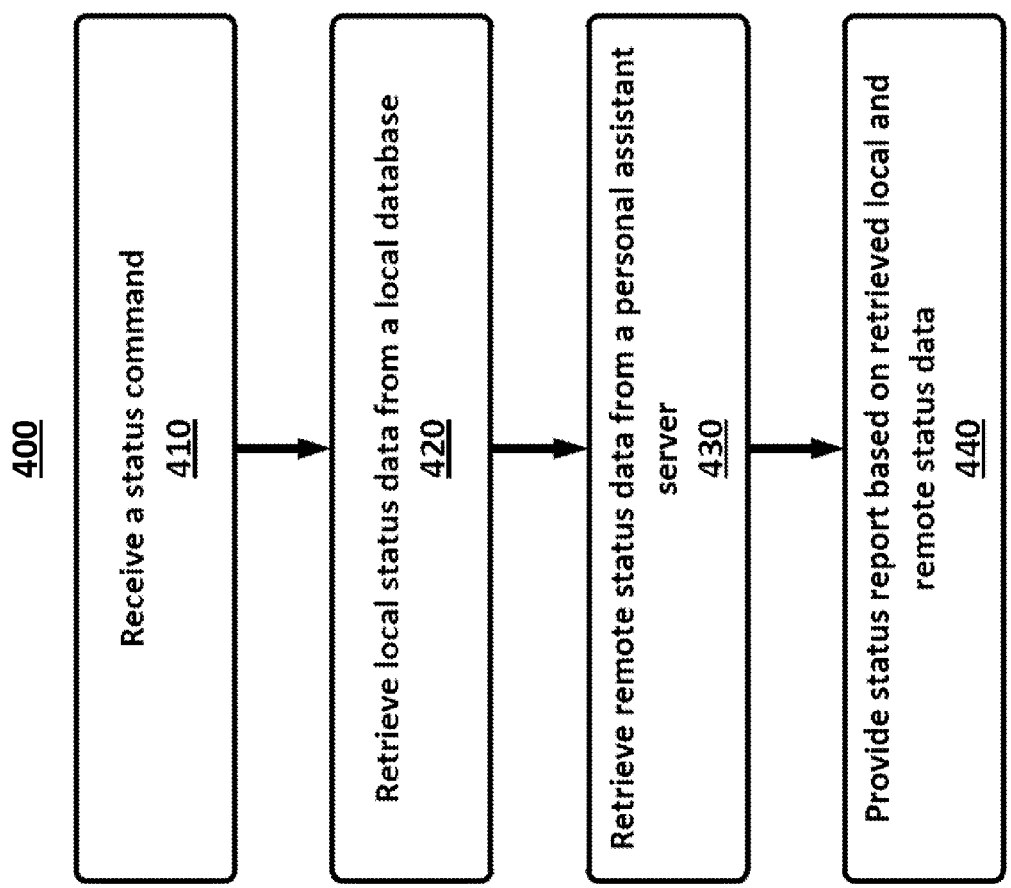
FIG. 4 is a flowchart illustrating an exemplary method for providing status reports on a user device.

FIG. 4 is a flowchart illustrating an exemplary method for providing status reports on a user device.

In step 410, the system receives a status command. In some embodiments, the system receives user input at a user interface, and the received user input includes a personal assistant status command. The status command may be designed to incorporate a plurality of known personal assistant commands. Thus, a user may input a single command (e.g., the voice command "give me a local status report") and retrieve data responsive to a number of personal assistant commands (e.g., battery life, calendar highlights, and missed calls). Any suitable status commands may be used. In some embodiments, the data requested by a status command may be based on user settings, as described above in connection with FIG. 2.

In step 420, the system retrieves local status data from a local database. In some embodiments, the local status data may be stored in memory of a user device and associated with the user device. In some embodiments, the local status data may be retrieved from a local status database on a user device (e.g., local status database 140 on user device 105 of FIG. 1). In some embodiments, local reporter software (e.g., local reporter software 245 may update the local status data on the local status database). Local status data may include, for example, information associated with the user device (e.g., user device 105), including, software, firmware, applications, and hardware of the user device.

In step 430, the system retrieves remote status data from a personal assistant server, as described above in connection with FIG. 3. In some embodiments, the personal assistant server may correspond to personal assistant server 310 of FIG. 3. Remote status data may include any suitable data feeds retrievable from third parties, including, for example, news and stock market feeds. In some embodiments, local reporter software of a user device (e.g., local reporter software 145 of user device 105 of FIG. 1) may retrieve remote status data from the personal assistant server and update a local status database on the user device with the remote status data.

In step 440, the system provides a status report based on retrieved local and remote status data. In some embodiments, the system generates a status report based on the retrieved local status data and remotes status data. In some embodiments, the system displays the status report on the user interface. In some embodiments, personal assistant software retrieves local and remote status data from a local status database. As described above, the inputted personal assistant status command in step 410 may call for data responsive to a plurality of existing personal assistant commands. Thus, personal assistant software may generate a status report in response to the personal assistant status command that includes a set of data responsive to a plurality of personal assistant commands. In some embodiments, the system generates the status report in accordance with user settings, as described above in connection with FIG. 2. In some embodiments, the system displays the status report in accordance with user settings, as described above in connection with FIG. 2. In some embodiments, personal assistant software generates and/or displays the status report. In some embodiments, personal assistant software generates an audio report using voice response software. In some embodiments, personal assistant software corresponds to personal assistant software 135 of FIG. 1.

Figure 5:
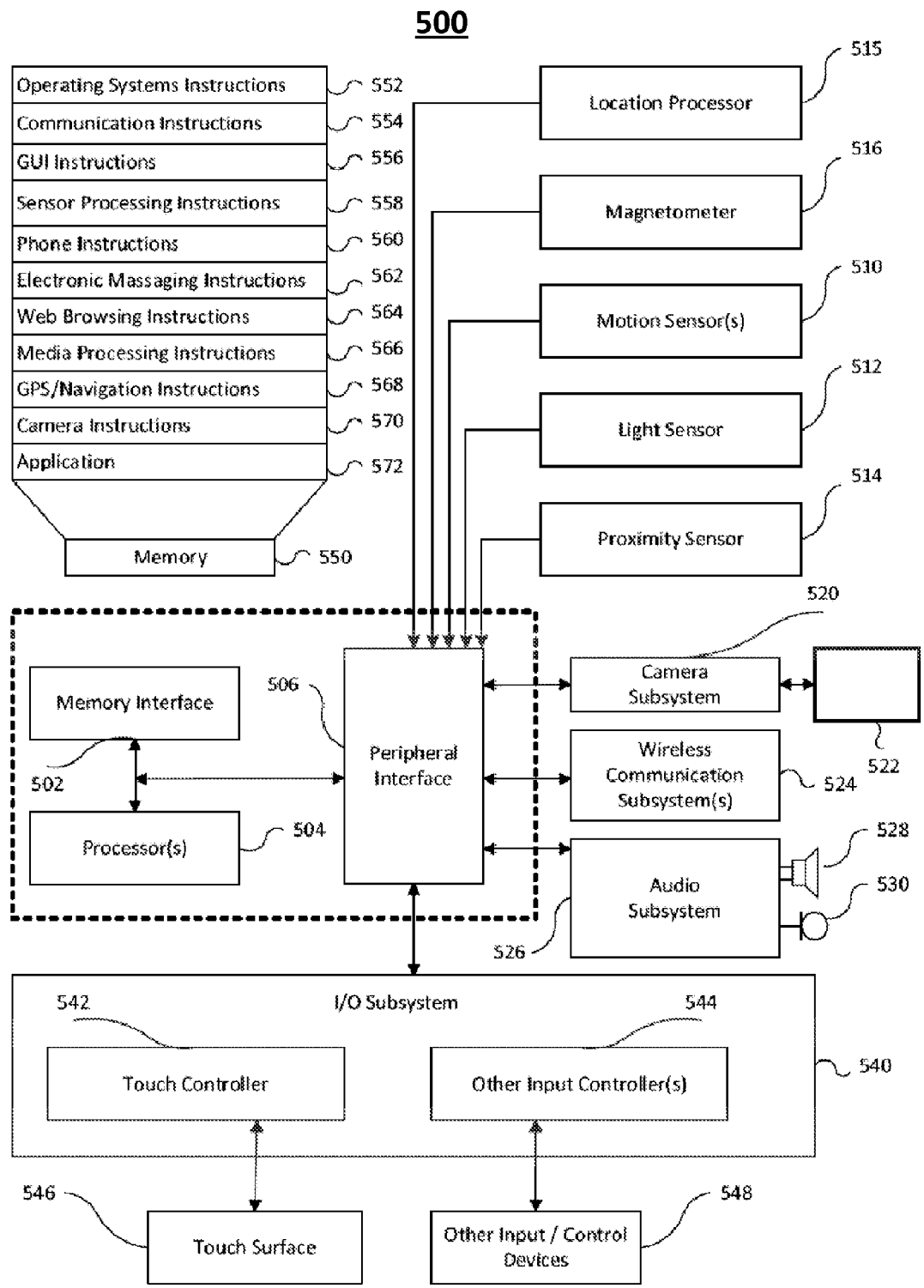
FIG. 5 illustrates a mobile device architecture that may be utilized to implement the various features and processes described herein.

FIG. 5 illustrates a mobile device architecture that may be utilized to implement the various features and processes described herein. Architecture 500 can be implemented in any number of portable devices including but not limited to smart phones, electronic tablets, and gaming devices. Architecture 500 as illustrated in FIG. 5 includes memory interface 502, processors 504, and peripheral interface 506. Memory interface 502, processors 504 and peripherals interface 506 can be separate components or can be integrated as a part of one or more integrated circuits. The various components can be coupled by one or more communication buses or signal lines.

Processors 504 as illustrated in FIG. 5 is meant to be inclusive of data processors, image processors, central processing unit, or any variety of multi-core processing devices. Any variety of sensors, external devices, and external subsystems can be coupled to peripherals interface 506 to facilitate any number of functionalities within the architecture 500 of the exemplar mobile device. For example, motion sensor 510, light sensor 512, and proximity sensor 514 can be coupled to peripherals interface 506 to facilitate orientation, lighting, and proximity functions of the mobile device. For example, light sensor 512 could be utilized to facilitate adjusting the brightness of touch surface 546. Motion sensor 510, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 506, such as a temperature sensor, a biometric sensor, or other sensing device to facilitate corresponding functionalities. Location processor 515 (e.g., a global positioning transceiver) can be coupled to peripherals interface 506 to allow for generation of geo-location data thereby facilitating geo-positioning. An electronic magnetometer 516 such as an integrated circuit chip could in turn be connected to peripherals interface 506 to provide data related to the direction of true magnetic North whereby the mobile device could enjoy compass or directional functionality. Camera subsystem 520 and an optical sensor 522 such as a charged coupled device (CCD) or a complementary metal-oxide semiconductor (CMOS) optical sensor can facilitate camera functions such as recording photographs and video clips.

Communication functionality can be facilitated through one or more communication subsystems 524, which may include one or more wireless communication subsystems. Wireless communication subsystems 524 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 524 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 524 may include hosting protocols such that the device may be configured as a base station for other wireless devices. Communication subsystems can also allow the device to synchronize with a host device using one or more protocols such as TCP/IP, HTTP, or UDP.

Audio subsystem 526 can be coupled to a speaker 528 and one or more microphones 530 to facilitate voice-enabled functions. These functions might include voice recognition, voice replication, or digital recording. Audio subsystem 526 in conjunction may also encompass traditional telephony functions.

I/O subsystem 540 may include touch controller 542 and/or other input controller(s) 544. Touch controller 542 can be coupled to a touch surface 546. Touch surface 546 and touch controller 542 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 546 may likewise be utilized. In one implementation, touch surface 546 can display virtual or soft buttons and a virtual keyboard, which can be used as an input/output device by the user.

Other input controllers 544 can be coupled to other input/control devices 548 such as one or more buttons, rocker switches, thumb-wheels, infrared ports, USB ports, and/or a pointer device such as a stylus. The one or more buttons (not shown) can include an up/down button for volume control of speaker 528 and/or microphone 530. In some implementations, device 500 can include the functionality of an audio and/or video playback or recording device and may include a pin connector for tethering to other devices.

Memory interface 502 can be coupled to memory 550. Memory 550 can include high-speed random access memory or non-volatile memory such as magnetic disk storage devices, optical storage devices, or flash memory. Memory 550 can store operating system 552, such as Darwin, RTXC, LINUX, UNIX, OS X, ANDROID, WINDOWS, or an embedded operating system such as VxWorks. Operating system 552 may include instructions for handling basic system services and for performing hardware dependent tasks. In some implementations, operating system 552 can include a kernel.

Memory 550 may also store communication instructions 554 to facilitate communicating with other mobile computing devices or servers. Communication instructions 554 can also be used to select an operational mode or communication medium for use by the device based on a geographic location, which could be obtained by the GPS/Navigation instructions 568. Memory 550 may include graphical user interface instructions 556 to facilitate graphic user interface processing such as the generation of an interface; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes, camera instructions 570 to facilitate camera-related processes and functions; and instructions 572 for any other application that may be operating on or in conjunction with the mobile computing device. Memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for providing status report data via a user device, the method comprising:
storing retrieval settings in a memory of the user device, the retrieval settings identifying a previously-specified local status data type and a previously-specified remote status data type;
receiving a voice user input via an input user interface of the user device, wherein the received voice user input includes a personal assistant status report command that incorporates a plurality of personal assistant commands requesting that a personal assistant application retrieve local status data and retrieve remote status data according to the retrieval settings; and
executing instructions stored in the memory of the user device, wherein the execution of the instructions by a processor of the user device:
retrieves the local status data matching the previously-specified local status data type of the retrieval settings from the user device in accordance with one or more of the personal assistant commands, the local status data including a numerical status value associated with functionality of a hardware component of the user device,
retrieves the remote status data matching the previously-remote status data type of the retrieval settings from one or more remote servers in accordance with one or more of the personal assistant commands,
retrieves advertisement data corresponding to an advertisement,
generates a status report based on the retrieved local status data and the retrieved remote status data, the status report including a plurality of information sets responsive to the plurality of personal assistant commands, the status report also including the advertisement based on the retrieved advertisement data, and
transmits the generated status report via email.

2. The method of claim 1, wherein the received personal assistant status report command incorporates ten or more personal assistant commands.

3. The method of claim 1, wherein the plurality of information sets are responsive to ten or more personal assistant commands.

4. The method of claim 1, wherein the remote server retrieves the remote status data from one or more third party databases.

5. The method of claim 1, wherein the remote status data is retrieved periodically at predetermined time intervals.

6. The method of claim 1, wherein the remote status data is retrieved in real-time.

7. The method of claim 1, wherein the input user interface includes a touchscreen interface based on a touchscreen of the user device, and wherein the received user input includes a touch gesture detected by the touchscreen interface of the touchscreen.

8. The method of claim 1, further comprising displaying the generated status report on a display screen of the user device.

9. The method of claim 1, wherein the numerical status value describes at least one of a battery level, a Wi-Fi signal strength, a cellular network signal strength, or some combination thereof.

10. The method of claim 1, further comprising outputting the generated status report via a speaker of the user device.

11. The method of claim 1, further comprising transmitting the generated status report via text message.

12. The method of claim 1, wherein the user device is one of a mobile device, a mobile phone, a smartphone, a laptop, a netbook, a tablet device, a personal digital assistant, a desktop computing device, a handheld computing device, a portable computing device, or some combination thereof.

13. An apparatus for providing status report data via a user device, the apparatus comprising:
a memory that stores retrieval settings identifying a previously-specified local status data type and a previously-specified remote status data type;
an input user interface that receives a voice user input, wherein the received voice user input includes a personal assistant status report command that incorporates a plurality of personal assistant commands requesting that a personal assistant application retrieve local status data and retrieve remote status data; and
a processor that executes instructions stored in the memory, wherein execution of the instructions by the processor:
retrieves the local status data matching the previously-local status data type of the retrieval settings from the user device in accordance with one or more of the personal assistant commands, the local status data including a numerical status value associated with functionality of a hardware component of the user device,
retrieves the remote status data matching the previously-remote status data type of the retrieval settings from one or more remote servers in accordance with one or more of the personal assistant commands,
retrieves advertisement data corresponding to an advertisement,
generates a status report based on the retrieved local status data and the retrieved remote status data, the status report including a plurality of information sets responsive to the plurality of personal assistant commands, the status report also including the advertisement based on the retrieved advertisement data, and
transmits the generated status report via email.

14. The apparatus of claim 13, wherein the personal assistant status report command incorporates ten or more personal assistant commands.

15. The apparatus of claim 13, wherein the plurality of information sets are responsive to ten or more personal assistant commands.

16. The apparatus of claim 13, wherein the one or more remote servers retrieve the remote status data from one or more third party databases.

17. The apparatus of claim 13, wherein the remote status data is retrieved periodically at predetermined time intervals.

18. The apparatus of claim 13, wherein the remote status data is retrieved in real-time.

19. The apparatus of claim 13, wherein the input user interface includes a touchscreen interface based on a touchscreen of the user device, and wherein the received user input includes a touch gesture detected by the touchscreen interface of the touchscreen.

20. A non-transitory computer-readable storage medium, having embodied thereon a program executable by a processor to provide status report data via a user device, the method comprising:

storing retrieval settings in a memory of the user device, the retrieval settings identifying a previously-specified local status data type and a previously-specified remote status data type;

receiving a voice user input via an input user interface of the user device, wherein the received voice user input includes a personal assistant status report command that incorporates a plurality of personal assistant commands requesting that a personal assistant application retrieve local status data and retrieve remote status data according to the retrieval settings; and retrieving the local status data matching the previously-specified local status data type of the retrieval settings from the user device in accordance with one or more of the personal assistant commands, the local status data including a numerical status value associated with functionality of a hardware component of the user device;

retrieving the remote status data matching the previously-specified remote status data type of the retrieval settings from one or more remote servers in accordance with one or more of the personal assistant commands;

retrieving advertisement data corresponding to an advertisement;

generating a status report based on the retrieved local status data and the retrieved remote status data, the status report including a plurality of information sets responsive to the plurality of personal assistant commands, the status report also including the advertisement based on the retrieved advertisement data; and transmitting the generated status report via email.

* * * * *